(12) United States Patent
Wunderlich

(10) Patent No.: US 8,798,085 B2
(45) Date of Patent: Aug. 5, 2014

(54) TECHNIQUES TO PROCESS NETWORK PROTOCOL UNITS

(75) Inventor: Mark W. Wunderlich, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1286 days.

(21) Appl. No.: 11/425,203

(22) Filed: Jun. 20, 2006

(65) Prior Publication Data

US 2007/0291779 A1    Dec. 20, 2007

(51) Int. Cl.
*H04L 12/28*    (2006.01)
*H04L 12/56*    (2006.01)
*G06F 13/00*    (2006.01)

(52) U.S. Cl.
CPC ............... *H04L 49/90* (2013.01); *G06F 13/00* (2013.01)
USPC ........... 370/412; 370/389; 370/392; 370/428; 370/466; 370/469; 370/471; 370/474; 711/153; 711/202; 711/206; 711/220; 711/E12.067

(58) Field of Classification Search
USPC .......................................................... 370/411
See application file for complete search history.

(56) References Cited

U.S. PATENT DOCUMENTS

| 7,624,198 | B1 * | 11/2009 | Johnson et al. ............... 709/250 |
| 7,826,457 | B2 * | 11/2010 | Bennett et al. ................ 370/394 |
| 2005/0132077 | A1 * | 6/2005 | Biran et al. ................... 709/230 |
| 2007/0208820 | A1 * | 9/2007 | Makhervaks et al. ......... 709/212 |

OTHER PUBLICATIONS

Shah et al., Direct Data Placement over Reliable Transports (v. 1.0), Oct. 2002.*
Jeff Hilland et al., RDMA Protocol Verbs Specification, Version 1.0, sections 7.2 and 8.1.2.2, Apr. 2003, 14 pages.
Hemal Shah et al., Direct Data Placement over Reliable Transports, Version 1.0, sections 6 and 7, Oct. 2002, 11 pages.
R. Recio et al., An RDMA Protocol Specification, Version 1.0, sections 6 and 7, Oct. 2002, 22 pages.
P. Culley et al., Marker PDU Aligned Framing for TCP Specification, Version 1.0, section 6, Oct. 2002, 4 pages.

* cited by examiner

*Primary Examiner* — Faruk Hamza
*Assistant Examiner* — Aixa A Guadalupe-Cruz
(74) *Attorney, Agent, or Firm* — Christopher K. Gagne

(57) ABSTRACT

Techniques are described herein that can be used to process inbound network protocol units. In some implementations, the techniques may process inbound DDP segments. In some implementations, a steering tag of an inbound network protocol unit may be used to access a context accessible to a network component. In some implementations, the context may include an array useful to determine whether all segments in a group have been received by the network component. In some implementations, the segments may be stored in a first buffer and transferred to a second buffer after all segments in a group have been received.

15 Claims, 8 Drawing Sheets

| Entry number | Block list | |
|---|---|---|
| 0 | BL_TO | NEXT_TO |
| 1 | BL_TO | NEXT_TO |
| N | BL_TO | NEXT_TO |

FIG. 7

TECHNIQUES TO PROCESS NETWORK PROTOCOL UNITS

FIELD

The subject matter disclosed herein relates to techniques to process network protocol units received from a network.

RELATED ART iWARP defines a set of protocols that can be used by one computer to directly place information into the memory of another computer. The feature may reduce transmission latency by minimizing demands on memory bus bandwidth and use of a central processing unit (CPU). The iWARP protocol suite includes Remote Direct Memory Access Protocol (RDMAP), Direct Data Placement (DDP), and Marker PDU Aligned Framing (MPA). The iWARP protocol suite may be layered above Transmission Control Protocol (TCP), Stream Control Transmission Protocol (SCTP), or other transport protocols.

FIG. 1A depicts an example frame format formed in accordance with the DDP protocol. As shown, the frame may include a TCP header, MPA header, DDP header, RDMAP header, payload, and cyclical redundancy check (CRC) value. For example, the TCP/IP protocol may be described at least in the publication entitled "Transmission Control Protocol: DARPA Internet Program Protocol Specification," prepared for the Defense Advanced Projects Research Agency (RFC 793) (September 1981), as well as revisions thereof; the MPA protocol may be described at "Marker PDU Aligned Framing for TCP Specification" (Version 1.0) (2002) available from the RDMA Consortium, as well as revisions thereof and "Marker PDU Aligned Framing for TCP Specification" from the IETF working forum Remote Direct Data Placement Work Group (February 2004) as well as revisions thereof; the DDP protocol may be described in "Direct Data Placement over Reliable Transports" (Version 1.0) (2002) available from the RDMA Consortium, as well as revisions thereof; and the RDMA protocol may be described in "An RDMA Protocol Specification" (version 1.0) (2002) available from the RDMA Consortium, as well as revisions thereof.

iWARP prescribes that each computer maintain a translation and protection table for registered physical memory areas with a special handle assigned to identify each such area. These handles are called "Steering Tags" or "Stags". The handles are intended to be opaque to other systems on the network and are only interpreted by their creator when received as part of an RDMA data placement message. Stags are exchanged between participating computers. The RDMA data placement message is called a "Tagged Message". An RDMAP tagged I/O message (e.g., Read Response or Write) arrives at a local computer carrying data and a local Stag. The local Stag is translated to locate the local registered memory table context that includes the address for local physical memory. After performing memory protection access checks, the local memory address is then used to directly copy the received data into a memory area.

Product solutions exist in the market today that implement iWARP prototcols. These implementations themselves must define Stags that point to translation and protection information. This translation and protection information is maintained in some table or context form either in the network interface components, in the case of full RDMA aware network interface components, or otherwise in system memory.

Some product implementations that support the iWARP protocols over standard TCP/IP do not embed RDMA protocol specific knowledge in the network interface component or in firmware. In many cases, the network interface component relies on the host software stack to specify a series (or list) of local memory buffers to receive inbound message data. The buffers to receive inbound message data will be referred to as "TCP_Buffers". Each individual buffer within this buffer list will normally be sized to match the maximum segment size (MSS) negotiated for the TCP connection (which may be approximately 1460 bytes). The network interface component moves the data from its receive FIFO memory into the TCP_Buffers. The network interface component driver next moves the data from the TCP_Buffer into the final user's defined data buffer.

BRIEF DESCRIPTION OF THE DRAWINGS

Embodiments of the present invention are illustrated by way of example, and not by way of limitation, in the drawings and in which like reference numerals refer to similar elements.

FIG. 7 depicts a block list array in accordance with some embodiments of the present invention.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 2:
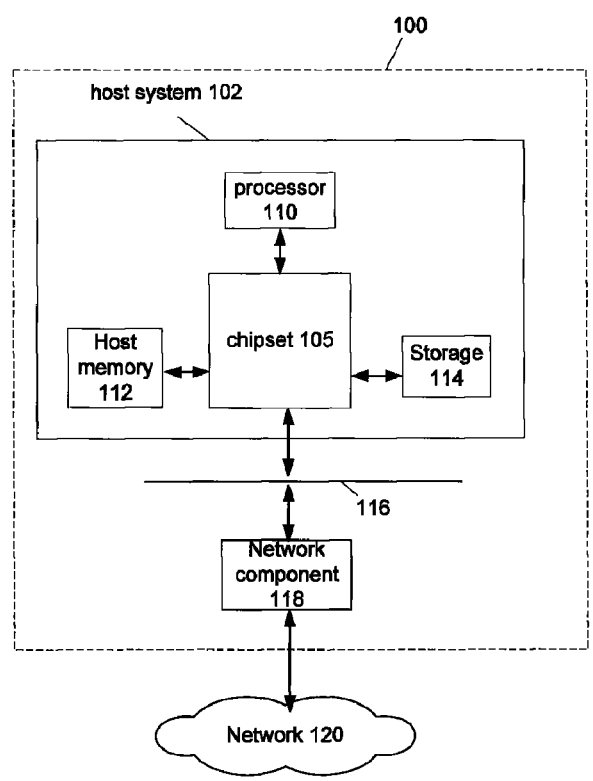
FIG. 2 depicts an example system embodiment in accordance with some embodiments of the present invention.

FIG. 2 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance at least with any of the following protocols: Small Computer Systems Interface (SCSI), Fibre Channel (FC), and/or Serial Advanced Technology Attachment (S-ATA).

In some embodiments, chipset 105 may include data mover logic (not depicted) capable to perform transfers of information within host system 102 or between host system 102 and network component 118. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements, which may result in the host processor running at much slower speeds. A data mover may include, for example, a direct memory access (DMA) engine. In some embodiments, data mover may be implemented as part of processor 110, although other components of computer system 100 may include the data mover. In some embodiments, data mover may be implemented as part of chipset 105.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up synchronous DRAM (SDRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

In some embodiments, network component may include the capability at least to perform at least one of the following: determine whether a received network protocol unit includes a valid CRC value, identify DDP segments (or other types of network protocol units), determine whether permission is granted for a DDP segment (or other types of network protocol units) to be written to the host system, write portions of DDP segments (or other types of network protocol units) to a buffer, determine whether all DDP segments (or other types of network protocol units) in a group have been received by the network component, and inform the host system that all DDP segments (or other types of network protocol units) in a group have been received by the network component.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard.

Figure 3:
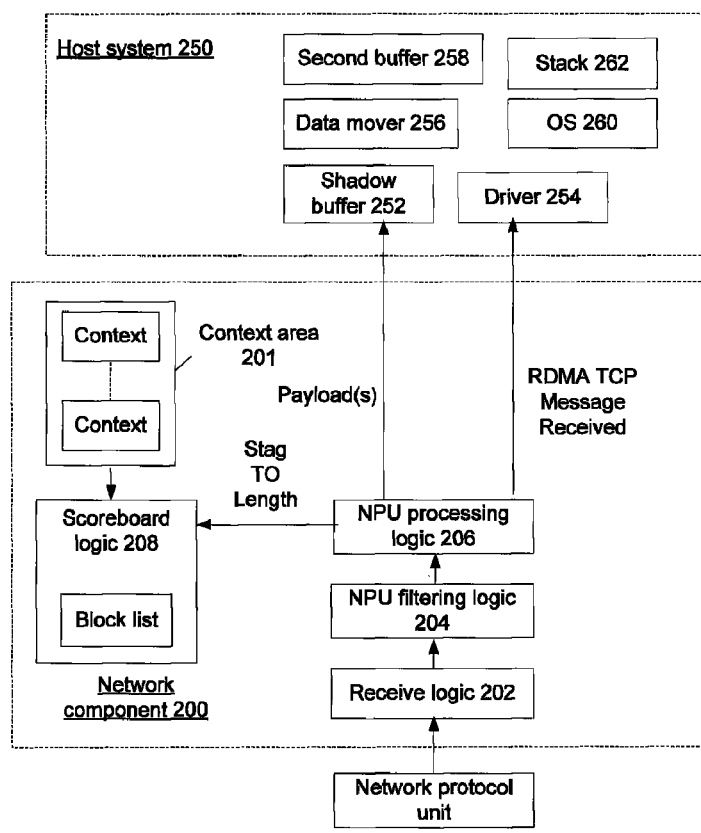
FIG. 3 depicts an example of elements that can be used in some embodiments of the present invention.

FIG. 3 depicts an example of elements that can be used in some embodiments of the present invention. For example, the system of FIG. 3 may include network component 200 and host system 250. Some embodiments of network component 200 may include: context area 201, receive logic 202, network protocol unit (NPU) filtering logic 204, NPU processing logic 206, and scoreboard logic 208. Although not depicted, network component 200 may include data mover logic capable of transferring information to and from at least host system 250.

Context area 201 may be a region of memory accessible to network component 200. For example, context area 201 may be stored in a memory device in network component 200. Context area 201 may store one or more context. A number of contexts stored in context area 201 may equal a number of outstanding inbound RDMA read or write requests (IRRD). The context can be several pieces of information retrieved by a network component from host memory during programming of the network component and prior to arrival of a network protocol unit with an Stag associated with the context. In some embodiments, the network component can retrieve necessary information from the context maintained by the host using an index provided in an Stag passed out to a transmitter. For example, the index may be a pointer to a physical address to a context maintained by the host. FIG. 4B and accompanying text provide a description of a suitable context structure, although other context structures may be used.

Receive logic 202 may be capable to receive network protocol units through a physical medium and transmit network protocol units through a physical medium. The physical medium may be a coaxial cable, wire-line, fiber optic cable, or other signal propagation medium. Alternatively or in addition, receive logic 202 may be capable to receive and transmit signals using wireless techniques. For example, receive logic 202 may receive and transmit network protocol units in conformance with applicable protocols such as Ethernet as described in IEEE Standard 802.3 (2002) and revisions thereof, although other protocols may be used. Receive logic 202 may be used to perform media access control operations as prescribed by applicable protocols such as Ethernet, although other protocols may be used, as well as other protocol-related processing.

Network protocol unit (NPU) filtering logic 204 may validate a CRC value (or other value) of the DDP segment. A suitable technique to perform CRC value validation is described in "TECHNIQUES TO SPECULATIVELY DETERMINE NETWORK PROTOCOL UNIT INTEGRITY", U.S. application Ser. No. 11/121,669, filed May 3, 2005 (attorney docket no. P21443). In accordance with an embodiment of the present invention, NPU processing logic 206 may speculatively determine boundaries of content received in a network protocol unit and perform a CRC validation on a portion of the speculatively located content. If the location of content is correctly speculated, a host system can use the content without further validation (e.g., CRC or other bit parity processing). Thereby, processing cycles in the host system may be used to perform operations other than CRC validation or other bit parity processing. Also, delays in network protocol unit availability due to queuing of network protocol units for CRC operations or other bit parity processing can be avoided and thereby latency of availability of network protocol units may be reduced.

NPU filtering logic 204 may determine whether a network protocol unit received by receive logic 202 is part of an RDMA protocol compliant stream. Various techniques can be used to determine whether the network protocol unit is part of an RDMA stream. For example, a destination address and port of a received network protocol unit can be used to determine whether the network protocol unit is part of an RDMA stream. If the received network protocol unit is part of an RDMA protocol compliant stream, then the received network protocol unit is to be processed by NPU processing logic 206.

If the received network protocol unit is not part of an RDMA protocol compliant stream, then the received network protocol unit may be processed by other techniques. For example, the network component may inform the driver of receipt of the network protocol unit. For example, the network component may route the network protocol unit to a receive buffer in the host system (not depicted) and driver may be interrupted to process the network protocol unit or request other logic to process the network protocol unit.

Figure 1A:
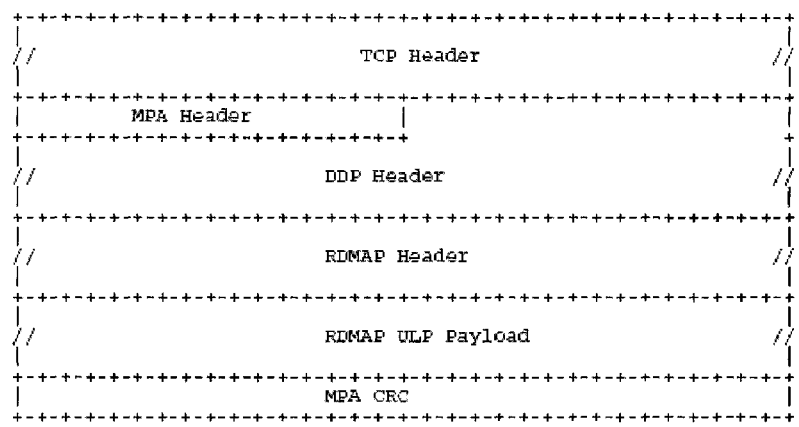
FIG. 1A depicts an example frame format formed in accordance with the DDP protocol.
Figure 1B:
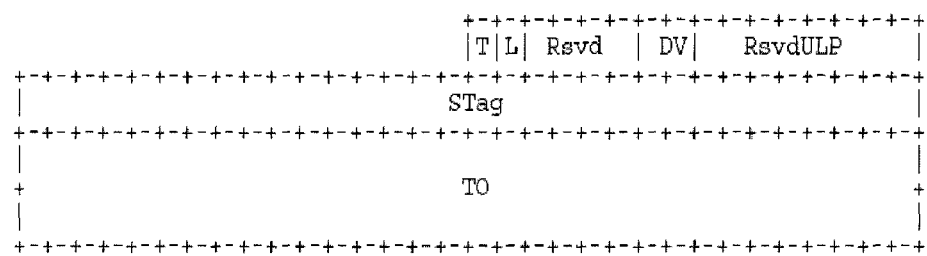
FIG. 1B shows an example of a DDP header in accordance with the DDP protocol.

In some embodiments, if the NPU is part of an RDMA protocol compliant stream, the NPU may include a DDP segment or may include a TCP message that includes a DDP segment. NPU processing logic 206 may determine whether the DDP header (or other type of header) of the received DDP segment (or other type of NPU) indicates the DDP segment is a tagged message. FIG. 1B shows an example of a DDP header as prescribed by a current version of the DDP protocol. For example, the DDP header indicates the DDP segment is a tagged message when the Tagged flag bit (T) of the DDP header is set to one. If the NPU processing logic 206 determines that the DDP segment is a tagged message, then NPU processing logic 206 may indicate to driver 254 receipt of a RDMA TCP message. Indication of receipt of an RDMA TCP message may be performed to maintain synchronization in accordance with the TCP protocol.

To indicate receipt of an RDMA TCP message, NPU processing logic 206 may transfer some or all headers from a received DDP segment (i.e., IP, TCP, MPA, DDP, and/or RDMAP) to a driver for processing. Headers may be transferred to a buffer in host system (not depicted). Subject to time constraints, headers from multiple DDP segments may be grouped together and passed to the host system in one transfer. A group of segments is also referred to as a message. Subject to time constraints, NPU processing logic 206 could wait until receipt of a DDP segment from a different group is received and pass headers from an existing and different group to the buffer in one transfer. One interrupt can be used to indicate to a driver to request processing of headers from different groups.

If NPU processing logic 206 determines that the DDP segment is not a tagged message, then the network component may route the network protocol unit to a receive buffer in the host system (not depicted) and driver may be interrupted to process the network protocol unit.

Figure 4A:
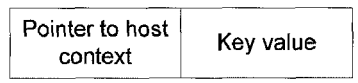
FIG. 4A depicts an example STAG format in accordance with some embodiments of the present invention.
Figure 4B:
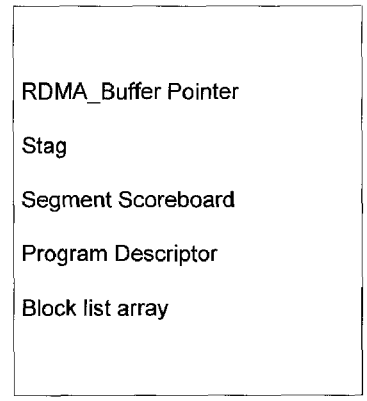
FIG. 4B depicts an example context in accordance with some embodiments of the present invention.

FIG. 4A depicts an example format of a steering tag ("Stag"), in accordance with embodiments of the present invention. In some embodiments, an Stag of a DDP header may include pointer and key portions, although other formats of Stags may be used. The pointer portion may include a physical memory pointer to a context in host memory and maintained by the host driver. Such context in host memory may be utilized by the host driver to track outstanding requests associated with a shadow buffer. Such requests may include RDMA read or write operations that reference the shadow buffer with specific Stags.

The key portion may be a rotating value such that each time it is passed out to a transmitter for use, it changes value. An example scenario is when a first device requests a read from a target device. The first device sends a request to the target device to request a read and the request includes an Stag. For example, the first request includes a key value of 1. A next request that reuses the same shadow buffer has key value of 2. A rotating key value may be managed by a driver. Rotating the key value may be used to prevent overwriting of a segment earlier written into the shadow buffer. A rotating key value may be used so that requests can be differentiated.

If the Stag matches an Stag in a context used or stored by the network component (shown under field entitled "Stag" with respect to FIG. 4B), then information in this context structure could be used by the network component to place a portion of the received DDP segment at the appropriate location in shadow buffer 252.

If the Stag does not match the Stag in the context used or stored by the network component, the network component may reject use of the Stag and may not place any portions of the received DDP segment associated with the Stag into host memory. For example, the network component may route the network protocol unit to a receive buffer in the host system (not depicted) and driver may be interrupted to process the network protocol unit.

In some embodiments, the Stag may be defined by the host system and shared with other computers prior to use but after registering it with the network component so that other computers can transmit network protocol units to the host system. The Stag value may be indicated to the network component before any remote inbound tagged message can arrive that includes such Stag. The network component in turn creates its own context at least for scoreboarding as indicated with regard to FIG. 6.

NPU processing logic 206 may copy data from DDP segments into shadow buffer 252 at locations based on tagged offsets. A tagged offset may be specified in a header of each segment. A "tagged offset" may be an offset in terms of bytes from a start of a buffer. A field in the context used or stored by network component (i.e., RDMA_Buffer Pointer) may specify a beginning location of the shadow buffer. After some or all DDP segments in a group are received, DDP segments may be transferred from shadow buffer 252 to a user buffer, layer 4 or higher buffer, or other buffer.

Figure 6:
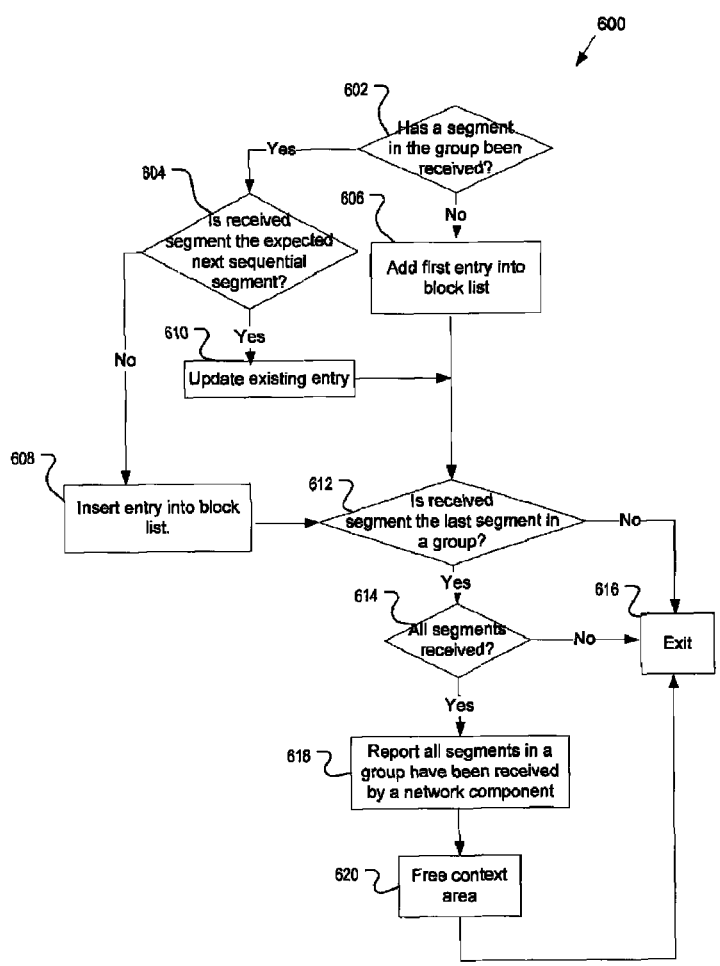
FIG. 6 depicts a process that can be used to determine whether all network protocol units in a grouping have been received in accordance with some embodiments of the present invention.

DDP segments of a message (group) may be received by a network component out of order. In some embodiments, scoreboard logic 208 determines whether all segments in a group have been received. A context used or stored by the network component may be used to ensure all segments within a group have been received. FIG. 6 and accompanying text provide a description of a suitable scoreboarding process.

Some embodiments allows for a small level of RDMA protocol processing knowledge to be held by the network component. In some embodiments, network component may merely identify inbound RDMA messages of type "TAGGED". This may provide a cost advantage over RDMA aware network components that maintain full translation protection tables in local memory.

In some embodiments, host system 250 may include shadow buffer 252, driver 254, data mover 256, second buffer 258, operating system 260, and stack 262.

Shadow buffer 252 may be a region of memory that is contiguous, word aligned, and large enough to store multiple DDP tagged messages (or other types of NPUs). Due at least to a contiguous structure, but not a necessary feature of any embodiment, a descriptor list to instruct a data mover to copy information may be formed ahead of time so that the formation of the descriptor does not induce a delay. Due at least to a contiguous structure, but not a necessary feature of any embodiment, the descriptor list may be small because a descriptor item is not needed for each logical portion of memory. This also may allow the context used or stored by the network component to record only the single starting address of the shadow buffer and overall length, as opposed to a scatter gather list. By contrast, use of a scatter gather list to reference non-contiguous portions of memory may use more descriptors.

Driver 254 may be a driver for the network component. Driver 254 may be capable to initialize the network component and permit other logic to interface with the network component. For example, in response to interrupts, driver 254 may indicate work to be initiated. For example, driver 254 may be interrupted in response to receipt of one or more segment in a group (message) or an error scenario has arisen when an unexpected or invalid RDMA tagged message for the same RDMA connection arrives, although other causes of interrupts are possible. Driver 254 may determine which logic needs to be used to respond to a request to perform an activity. For example, driver 254 may examine a network protocol unit's header to determine whether TCP processing is needed next or another type of protocol processing is needed (e.g., RDMA processing).

Data mover 256 may be capable at least to copy one or more portion of information in shadow buffer 252 to second buffer 258. For example, after some or all DDP segments in a group are received, DDP segments may be copied from shadow buffer 252 to second buffer 258. For example, after all DDP segments in a group are stored in shadow buffer 252, all DDP segments may be copied from shadow buffer 252 to second buffer 258 in a single copy operation using data mover 256 in response to one or more descriptors. Second buffer 258 may be a user buffer, layer 4 or higher buffer, or other buffer.

Operating system (OS) 260 may be an operating system executable by a processor. For example, suitable embodiments of OS 260 include, but are not limited to, Linux, UNIX, FreeBSD, or Microsoft Windows compatible operating systems. OS 260 may include the capability to determine whether a network protocol unit complies with TCP.

Stack 262 may determine whether a network protocol unit complies with TCP or other protocol (e.g., RDMA).

FIG. 4B depicts an example context in accordance with some embodiments of the present invention. The context of FIG. 4B may be used by the network component to manage incoming requests to RDMA requests to read or write information. In some embodiments, the context may be stored by network component. For example, a context may include fields described in the following Table 1. In some embodiments, a context may be stored at the start of a cache line.

TABLE 1

| Field name | Brief Description |
| --- | --- |
| RDMA_Buffer Pointer | Points to beginning memory location of shadow buffer. |
| Stag | May be used to determine whether a received network protocol unit can be written into the shadow buffer. |
| Segment Scoreboard | May be used to keep track of arriving DDP segments (or other network protocol units) to determine whether all DDP segments (or other network protocol units) in a group have been received. May include a series of fields that can be used to keep track of arriving DDP segments (or other network protocol units) such as the BL_TO field, last segment received field, and block list length field. The BL_TO field may indicate whether a first segment in a group has been received. The last segment received field may indicate whether a last segment in a group has been received. The block list length field may indicate a number of entries in the block list array. |
| Program Descriptor | A pointer to a previously prepared data mover descriptor chain used to request a transfer operation using a data mover. |
| Block list array | Used to keep track of arriving DDP segments (or other network protocol units) to determine whether all DDP segments (or other network protocol units) in a group have been received. Includes entry indicating the tagged offset of the earliest received segment in a group as well as the expected tagged offset of the next sequential segment. An example of a block list array is described with regard to FIG. 7. |

In some embodiments, contexts maintained by the host can be used to populate the contexts maintained by the network component. In some embodiments, the host can provide the necessary information to populate the context maintained by the network component prior to when any network protocol unit can be transmitted to the host using the Stag. In some embodiments, the network component can retrieve necessary information from the context maintained by the host using an index provided in an Stag passed out to a transmitter for use to transmit network protocol units to the host, For example, the index may be a pointer to a physical address to a context maintained by the host.

Figure 5:
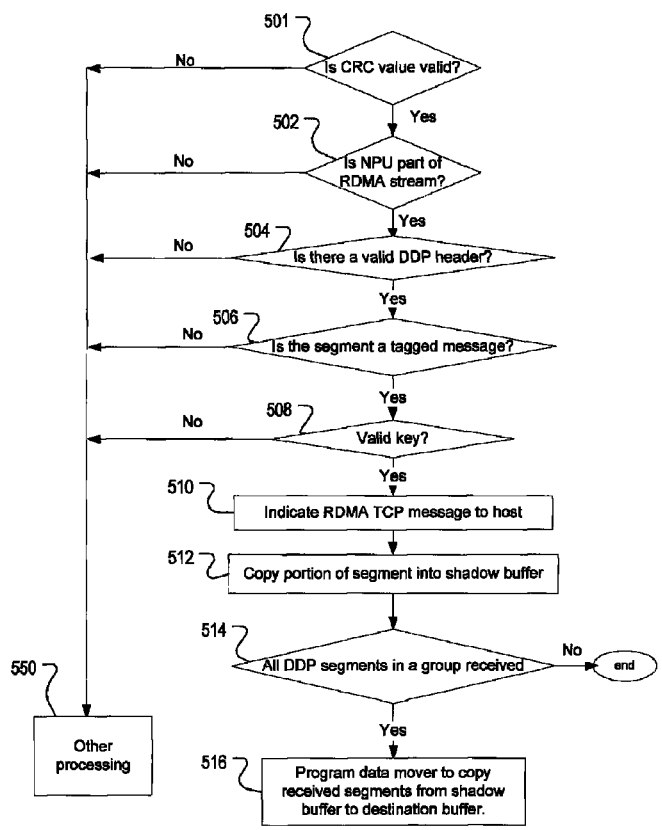
FIG. 5 depicts a process that can be used to process received network protocol units in accordance with some embodiments of the present invention.

FIG. 5 depicts a process that can be used to process received network protocol units in accordance with some embodiments of the present invention. Process 500 may be performed in response to receipt of a network protocol unit.

In block 501, a network component may determine whether a CRC value of a received network protocol unit is valid. In some embodiments, the network component may speculatively validate the CRC value (or other integrity validation value) of the network protocol unit and pass up the results to the driver. A suitable technique to validate the CRC value of the network protocol unit was described earlier. If the CRC value is determined to be valid, block 502 may follow. If the CRC value is determined not to be valid, block 550 may follow.

In block 502, a network component may determine whether the received network protocol unit is part of an RDMA protocol compliant stream. For example, to determine whether the network component may examine a destination address and port of the received network protocol unit is part of an RDMA stream protocol compliant stream. If the received network protocol unit is part of an RDMA protocol compliant stream, then block 504 may follow. If the received network protocol unit is not part of an RDMA protocol compliant stream, then block 550 may follow.

In block 504, the network component may determine whether a DDP header in the received network protocol unit is present and valid. For example, a byte offset from a start of the TCP packet portion of the network protocol unit may be where a DDP header is located. Other protocol headers may be located. For example, if the DDP header version is not valid, the DDP header is considered not valid. If the DDP header is valid, block 506 may follow. If the DDP header is not valid, block 550 may follow.

In block 506, the network component may determine whether the DDP header indicates the network protocol unit is a tagged message. For example, the DDP header indicates the DDP segment is a tagged message when the Tagged flag bit (T) of the DDP header is set to one. The Tagged flag bit (T) may be located at a predefined offset from the start of the network protocol unit. If the segment is a tagged message, then block 508 may follow. If the segment is not a tagged message, then block 550 may follow.

In block 508, the network component may determine whether the key associated with the received network protocol unit is valid. If the Stag from the received network protocol unit (which includes pointer and key portions) matches the Stag in the context used by the network component, block 510 may follow. If the Stag does not match the Stag in any context used by the network component, block 550 may follow. The network component may determine whether the context for a received network protocol unit is stored in a context area accessible to the network component or stored in the network component. The host driver may register a new context before giving a key to a remote device. The context may be stored in a context area in the network component or accessible to the network component upon or prior to arrival of a tagged message associated with the context.

In block 510, the network component may indicate receipt of an RDMA TCP message to the driver of the host system or to other logic. To indicate receipt of an RDMA TCP message, one or more headers of a network protocol unit may be provided. Indication of receipt of a RDMA TCP message may be performed to keep a TCP layer in synch, If the TCP protocol is not utilized and if RDMA protocol compliant messages are transferred over Ethernet or a transport protocol that does not have a sequencing requirement, indication of received headers may not be performed.

In block 512, the network component may copy portions of the received network protocol unit to a shadow buffer in the host system at an offset from the start of the shadow buffer as indicated by the tagged offset in the DDP header of the network protocol unit. The start of the shadow buffer may be specified in the context by RDMA_Buffer Pointer.

In block 514, the network component may determine whether all segments of a group of DDP segments have been received. For example, a suitable process to implement block 514 may be described with respect to FIG. 6 and accompanying text. If all DDP segments in a group have been received, then block 516 may follow. If all DDP segments in a group have not been received, then the process may end.

In block 516, the driver in the host system may program a data mover accessible by the host system to copy received segments from the shadow buffer to a destination buffer. Waiting until some or all segments in a group (message) have been received may reduce a number and size of descriptors used to program a data mover to copy segments from a first location to a second location. This may reduce the number of data mover copy operations required to move all data associated with multiple DDP segments. The Program Descriptor field of the context may be used as a descriptor to request the transfer of information from the shadow buffer to the destination buffer.

In block 550, the network component may forward data and/or other portions of the received network protocol unit to a buffer for processing by logic in the host system such as an operating system or protocol stack. The network component may interrupt the host to let it know a network protocol unit has been received and is available for processing. If a context is not associated with a key received in a network protocol unit, the process may perform error recovery which may include closing a connection associated with the segment that had a key which did not match a key in any context. For example, in the event a CRC value was determined not valid in block 501, the host may perform a CRC value validation process.

FIG. 6 depicts a process that can be used to determine whether all network protocol units in a grouping (such a grouping may include but is not limited to a DDP message) have been received in accordance with some embodiments of the present invention. In block 602, the process may determine whether a segment in a group has been previously received. For example, if a tagged offset in the block list of the context is not NULL or the block list length is not NULL, then a segment in this group has been previously received and block 604 may follow. If a tagged offset in the block list of the context is NULL or the block list length is NULL, then no segment in the group has been previously received and block 606 may follow. Other indications of whether a segment in the group has been previously received may be used.

In block 604, the process may determine whether the received segment is the expected next sequential segment and the block list length is one. For example, block 604 may include determining whether the tagged offset of the expected next sequential segment (NEXT_TO) in the block list of the context matches the tagged offset of the received segment (message TO). In a best case scenario, segments arrive in order, so the block list includes one entry. If segments arrive out of order, multiple entries may be present in the block list. If the received segment is not an expected next sequential segment or there is more than one entry in the block list, then block 608 may follow. If the received segment is an expected next sequential segment and there is a single entry in the block list, then block 610 may follow.

In block 606, the process may add a first entry to the block list. An example block list is depicted in FIG. 7. For example, for the first entry, the tagged offset of the received segment (BL_TO) may be the tagged offset from the DDP header of the received DDP segment. The expected tagged offset of the next segment (NEXT_TO) for the first entry may be determined by adding a length value for the data portion of the received segment to the tagged offset of the received segment. The length may be specified in an MPA header or from other source such as another message protocol header above or below DDP protocol header. This DDP segment may be the first segment of a group.

In block 608, the process may insert a new entry into the block list. If the received segment is positioned immediately before a previously received segment, the new block list entry associated with the received segment can be merged with the existing block list entry associated with the previously received segment. The determination that the new block list entry for the received segment is to be positioned immediately before the existing entry for the previously received segment can be made when the NEXT_TO for the new block list entry is equal to the BL_TO of the previous block list entry. For example, to merge entries, the BL_TO from the previous block list entry is replaced with BL_TO of this new entry but the NEXT_TO from the previous block list entry remain the same.

If the received segment is positioned more than immediately before a previously received segment, then an entry that identifies the received segment is inserted in the front of the block list. The tagged offset of the received segment (BL_TO) may be the tagged offset from the DDP header of the received DDP segment. The NEXT_TO of the inserted entry may be a sum of the TO of the received segment and the size of the data portion of the received segment. The length of the received segment may be the length of the data portion of the received DDP segment. The length may be the length of the DDP segment, as specified in the MPA header, less the DDP header size. The DDP header size may be fourteen (14) bytes for tagged messages. The block list length may increase by one.

If the received segment is positioned more than immediately after the previously received segment, then an entry that identifies the received segment is inserted in the end of the block list. The BL_TO of the inserted entry may be the TO of the received segment and the NEXT_TO of the inserted entry may be the sum of the TO of the received segment and the size of the data portion of the received segment. The length of the received segment may be the length of the data portion of the received DDP segment. The length may be the length of the DDP segment, as specified in the MPA header, less the DDP header size. The DDP header size may be fourteen (14) bytes for tagged messages. The block list length may increase by one.

A check may be made to determine if the new block list entry is filling a hole in the block list (i.e., that block list entries exist logically before and/or after the new block list entry). If so, a merge is performed so that one entry results from a combination of the new entry, the logically before entry, and/or logically after entry. The resulting entry from the merge is an entry with the BL_TO of the first entry and the NEXT_TO of the numerically last entry. The block list length is modified to account for the updated number of entries.

In block 610, the process may update an existing entry. For example, for an existing entry in which an expected tagged offset of a next expected sequential segment matches a tagged offset of a received network protocol unit, the tagged offset (BL_TO) may stay the same. However, for the existing entry, the tagged offset of the next expected sequential segment (NEXT_TO) may be set equal to a sum of the existing NEXT_TO value and the length of the received segment (TO). The length of the received segment may be the length of the data portion of the received DDP segment. The length may be the length of the DDP segment, as specified in the MPA header, less the DDP header size. The DDP header size may be fourteen (14) bytes for tagged messages.

In block 612, the process may determine whether the segment is the last segment in the group. For example, a DDP header has a "last" bit field (shown as bit "L" in the DDP header of FIG. 1B) which indicates whether a segment is a last in a group. If the received segment is a last in a group, then the last segment received field in a context is set to indicate that a last segment has been received and block 614 may follow. If the received segment is not the last segment in a group, then block 616 may follow.

In block 614, the process may determine whether all segments in a group have been received. For example, if a block array list size is one and a last segment has been received then all segments in a group have been received. If all segments in a group have not been received, then block 616 may follow. If all segments in a group have been received, then block 618 may follow.

In block 616, the process may exit. The process may execute again when or after another segment is received.

In block 618, the process may report to a driver that all segments in a group have been received by a network component. For example, the process may report receipt of all segments in a DDP message as well as starting TO of segment in start of group and overall length of segments in group, and the STAG of the received segment. Accordingly, interrupts of a host CPU to execute a driver may be reduced when multiple or all DDP segments in a group (message) have been received.

In block 620, the process may free the context in the context area. The context may be available to be freed to be overwritten by another context. The context may be flushed from memory.

FIG. 7 depicts an example format of a block list array that can be used to determine whether all DDP segments in a group have been received.

Each entry may include a field that includes a tagged offset for a first segment in a group that has been received (shown as BL_TO) and a field for an expected tagged offset of a next sequential received segment (NEXT_TO). A tagged offset may be an offset from a start of a memory area in which data from a segment is to be stored. A tagged offset of the next expected sequential segment (NEXT_TO) may be set equal to the tagged offset of the received segment plus the length of the data portion of the received DDP segment.

The block list array may be part of a context. For example, a block list array may include one or more entries. If segments arrive in order or reverse order, then the block list may be one entry. If segments arrive such that gaps exist between received segments, then the block list may be more than one entry with gaps in between NEXT_TO of an entry and a BL_TO of a next entry.

If the block list size is two or more, and a segment is received that fits in a gap between received segments, the entries representing the received segments may be collapsed to one entry. The one entry may have a tagged offset (BL_TO) of the earliest segment in the group and a tagged offset of the next expected sequential segment (NEXT_TO) equal to the next expected sequential segment (NEXT_TO) of the numerically last received segment in the group.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   receiving an indication of receipt of a network protocol unit by a network component associated with a host system;
   selectively requesting storage of the received network protocol unit into a first buffer in response to a determination that a tag in the received network protocol unit permits access to a memory device, the first buffer being in the host system and also being a contiguous, word aligned region to store as a contiguous structure multiple direct data placement (DDP) tagged messages; and
   selectively copying, in a single copy operation, to a second buffer in the host system network protocol units of at least one group that are stored as the contiguous structure in the first buffer, the single copy operation being in response to one or more descriptors that instruct a data mover to perform the single copy operation, wherein the at least one group comprises DDP segments of portions of at least two messages stored in the first buffer, the selectively copying being to permit a driver to process the at least one group, processing of the at least one group by the driver being requested by a single interrupt, the network component being to determine whether all of the DDP segments comprised in the at least one group have been received by the network component and also being to inform the host system that all of the DDP segments comprised in the at least one group have been received by the network component, the network component also to create and store a context for the at least one group, the context recording a starting address of the first buffer and an overall length of the contiguous structure, the network component including scoreboard logic to use the context in a scoreboarding process that tracks arriving DDP segments using a block list array to determine whether all of the DDP segments comprised in the at least one group have been received, in which, if a DDP segment gap exists between received DDP segments, the DDP segment gap is to be indicated by a corresponding gap between entries in the block list array.

2. The method of claim 1, further comprising:
   determining whether all network protocol units in a second group have been received by:
   generating a block list with at least one entry, wherein each entry of the list includes a tagged offset of a received segment and an expected tagged offset of a next expected sequential received segment and
   monitoring for a receipt of a last network protocol unit in the second group and
   selectively copying to a second buffer network protocol units of the second group that are stored in the first buffer.

3. The method of claim 2, further comprising providing accessibility to context information, wherein the context information comprises at least a tag and block list array.

4. The method of claim 3, wherein the determination that a tag in the network protocol unit permits access to a memory device comprises matching of the tag with a tag of the context.

5. The method of claim 1, wherein the first buffer comprises a shadow buffer and wherein the storing comprises storing at a location in the shadow buffer specified in part by a tagged offset associated with the network protocol unit.

6. The method of claim 1, wherein selectively copying comprises issuing a request to a data mover to copy at least one network protocol unit to the second buffer.

7. The method of claim 6, wherein the issuing a request comprises transferring a descriptor, wherein the descriptor is written into a memory location and available for use prior to the issuing.

8. The method of claim 1, wherein the first buffer comprises a buffer allocated within a contiguous area in memory.

9. An apparatus comprising:
   a memory in a network component to store a context associated with one or more network protocol units, the context being created and stored by the network component, the network component being associated with a host system;
   logic in the network component to identify a tag in a received network protocol unit;
   logic in the network component to identify the stored context as being associated with the tag;
   logic to selectively request storage of the received network protocol unit into a first buffer in response to a determination that the tag in the network protocol unit permits access to a memory device, the first buffer being in the host system and also being a contiguous, word aligned memory region to store multiple direct data placement (DDP) tagged messages; and
   logic to selectively request a single copy operation to copy to a second buffer of network protocol units of at least one group that are stored as a contiguous structure in the first buffer, the single copy operation being in response to one or more descriptors that instruct a data mover to perform the single copy operation, wherein the at least one group comprises DDP segments of portions of at least two messages stored as the contiguous structure in the first buffer, copying of the at least one group to the second buffer being to permit a driver to process the at least one group, processing of the at least one group by the driver being requested by a single interrupt, the network component being to determine whether all of the DDP segments comprised in the at least one group have been received by the network component and also being to inform the host system that all of the DDP segments comprised in the at least one group have been received by the network component, the context recording a starting address of the first buffer and an overall length of the contiguous structure, the network component including scoreboard logic to use the context in a scoreboarding process that tracks arriving DDP segments using a block list array to determine whether all of the DDP segments comprised in the at least one group have been received, in which, if a DDP segment gap exists between received DDP segments, the DDP segment gap is to be indicated by a corresponding gap between entries in the block list array.

10. The apparatus of claim 9, further comprising:
logic to determine whether all network protocol units in a group have been received, the logic to determine whether all network protocol units in a group have been received comprising:
  logic to generate a block list with at least one entry, wherein each entry of the list includes a tagged offset of a received segment and an expected tagged offset of a next expected sequential received segment and
  logic to monitor for a receipt of a last network protocol unit in the group.

11. The apparatus of claim 9, wherein the context comprises at least a tag and block list array.

12. The apparatus of claim 11, wherein the determination that a tag in the network protocol unit permits access to a memory device comprises matching of the tag in the received network protocol unit with a tag of the context.

13. The apparatus of claim 9, wherein the first buffer comprises a shadow buffer and wherein to request storage includes a request to store at a location in the shadow buffer specified in part by a tagged offset associated with the received network protocol unit.

14. The apparatus of claim 9, wherein the network component is to issue a descriptor, wherein the descriptor is written into a memory location and available for use prior to issuing of a request to perform the single copy operation.

15. The apparatus of claim 9, wherein the memory is to store a context associated with one or more network protocol units prior to receipt of the received network protocol unit.

* * * * *